(12) United States Patent
Matsumura

(10) Patent No.: US 10,358,586 B2
(45) Date of Patent: Jul. 23, 2019

(54) REACTIVE HOT-MELT ADHESIVE COMPOSITION

(71) Applicant: The Yokohama Rubber Co., LTD., Minato-ku, Tokyo (JP)

(72) Inventor: Misaki Matsumura, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 201 days.

(21) Appl. No.: 15/323,071

(22) PCT Filed: May 26, 2015

(86) PCT No.: PCT/JP2015/065080
§ 371 (c)(1),
(2) Date: Dec. 29, 2016

(87) PCT Pub. No.: WO2016/002391
PCT Pub. Date: Jan. 7, 2016

(65) Prior Publication Data
US 2017/0158929 A1    Jun. 8, 2017

(30) Foreign Application Priority Data
Jul. 2, 2014 (JP) .................................. 2014-136761

(51) Int. Cl.
| C09J 175/08 | (2006.01) |
| C09J 175/04 | (2006.01) |
| C08G 18/76 | (2006.01) |
| C08G 18/12 | (2006.01) |
| C08L 9/00 | (2006.01) |
| C08L 33/12 | (2006.01) |
| C08L 101/02 | (2006.01) |
| C08L 101/08 | (2006.01) |

(52) U.S. Cl.
CPC ............ *C09J 175/08* (2013.01); *C08G 18/12* (2013.01); *C08G 18/7671* (2013.01); *C08L 9/00* (2013.01); *C08L 33/12* (2013.01); *C08L 101/025* (2013.01); *C08L 101/08* (2013.01); *C09J 175/04* (2013.01); *C08G 2170/20* (2013.01)

(58) Field of Classification Search
CPC . C08G 18/4812; C08G 2170/20; C09J 175/08
See application file for complete search history.

(56) References Cited

U.S. PATENT DOCUMENTS

| 4,808,255 A | 2/1989 | Markevka et al. |
| 6,280,561 B1* | 8/2001 | McInnis ................. C08G 18/10 156/305 |
| 8,440,308 B2* | 5/2013 | Harano ..................... A43B 9/12 156/275.7 |
| 2003/0022973 A1 | 1/2003 | Hung et al. |
| 2004/0143034 A1* | 7/2004 | Primke ..................... B29B 9/10 523/176 |
| 2004/0249076 A1* | 12/2004 | Slark .................. C08G 18/4063 525/123 |
| 2008/0194723 A1* | 8/2008 | Hwang .............. C08G 18/0823 522/68 |
| 2009/0110937 A1* | 4/2009 | Onuoha ................. C08G 18/12 428/424.2 |
| 2010/0048770 A1* | 2/2010 | Burckhardt ............ C08G 18/12 524/47 |
| 2010/0152394 A1* | 6/2010 | Slark ....................... C08G 18/12 525/452 |
| 2010/0324254 A1 | 12/2010 | Saiki |
| 2011/0236682 A1* | 9/2011 | Okamoto ............... C09J 133/14 428/355 CN |
| 2012/0121900 A1* | 5/2012 | Niwa ......................... C09J 7/26 428/355 AC |
| 2013/0210989 A1 | 8/2013 | Krebs et al. |
| 2013/0345354 A1* | 12/2013 | Tamogami ............. C08G 18/12 524/507 |
| 2017/0158929 A1* | 6/2017 | Matsumura ............ C09J 175/04 |

FOREIGN PATENT DOCUMENTS

| JP | H03-259981 | 11/1991 |
| JP | H05-017736 | 1/1993 |
| JP | H10-088077 | 4/1998 |
| JP | 3344732 | 11/2002 |
| JP | 2005-350514 | 12/2005 |
| JP | 2011-001465 | 1/2011 |
| JP | 2013-543529 | 12/2013 |
| WO | WO 2002/083807 | 10/2002 |
| WO | WO 2010/068736 | 6/2010 |
| WO | WO 2012/041719 | 4/2012 |

OTHER PUBLICATIONS

Desmodur VP LS 2397, Article, Bayer Material Science, Mar. 18, 2013, 3 pages, Germany.
Extended European Search Report for application No. 15815434.4 dated Nov. 22, 2017, 6 pages, Germany.

* cited by examiner

Primary Examiner — Michael M Dollinger
(74) Attorney, Agent, or Firm — Thorpe North & Western

(57) ABSTRACT

A reactive hot-melt adhesive composition of the present technology is moisture curable and contains: a urethane prepolymer having an isocyanate group; a (meth)acrylic resin; and a liquid polymer containing (meth)acryloyloxy groups and/or isocyanate groups.

11 Claims, No Drawings

REACTIVE HOT-MELT ADHESIVE COMPOSITION

TECHNICAL FIELD

The present technology relates to a reactive hot-melt adhesive composition.

BACKGROUND ART

Conventionally, a reactive hot-melt adhesive composition containing: (A) a graft polymer formed by copolymerizing one type or two or more types of monomers selected from the group consisting of polystyrene-based macromers having a vinyl group at a molecular terminal, alkyl acrylates in which an alkyl group has 1 to 12 carbons, and alkyl methacrylates in which an alkyl group has 1 to 12 carbons, (B) polyol, and (C) polyisocyanate has been proposed, and it is described that the composition can contain a plasticizer or the like (Japanese Unexamined Patent Application Publication No. H05-017736A).

However, the inventor of the present application found that conventional reactive hot-melt adhesives may not satisfy the level of adhesion (especially, water resistant adhesion) that has been required recently.

SUMMARY

The present technology provides a reactive hot-melt adhesive composition which has excellent water resistant adhesion.

As a result of diligent research to solve the above problem, the inventor of the present technology found that the composition containing: a urethane prepolymer having an isocyanate group, a (meth)acrylic resin, and a liquid polymer containing a (meth)acryloyloxy group and/or an isocyanate group can be a reactive hot-melt adhesive that is moisture curable and that has excellent adhesion (in particular, excellent hot water resistant adhesion), and thus completed the present technology.

Specifically, the inventor discovered that the problems described above can be solved by the following features.

(1) A reactive hot-melt adhesive composition that is moisture curable,
the reactive hot-melt adhesive composition including:
a urethane prepolymer having an isocyanate group;
a (meth)acrylic resin; and
a liquid polymer containing at least one selected from the group consisting of (meth)acryloyloxy groups and isocyanate groups.

(2) The reactive hot-melt adhesive composition according to (1) above, where an amount of the liquid polymer is from 1 to 5 parts by mass per 100 parts by mass total of the (meth)acrylic resin and a polyol and a polyisocyanate that are used in production of the urethane prepolymer.

(3) The reactive hot-melt adhesive composition according to (1) or (2) above, where the urethane prepolymer is a compound produced by reacting at least one selected from the group consisting of bifunctional polyols and trifunctional polyols with polyisocyanate; and
the bifunctional polyol is at least one type selected from the group consisting of polyoxypropylene diols, polyoxyethylene diols, and castor oil-based polyols.

(4) The reactive hot-melt adhesive composition according to (3) above, where a weight average molecular weight of the trifunctional polyol is 5,000 or greater.

(5) The reactive hot-melt adhesive composition according to (3) or (4) above, where an amount of the trifunctional polyol is from 5 to 50 mass % relative to a total amount of polyol used in production of the urethane prepolymer.

The reactive hot-melt adhesive composition of the present technology has excellent water resistant adhesion.

DETAILED DESCRIPTION

The present technology is described in detail below.

The reactive hot-melt adhesive composition of the present technology (composition of the present technology) is a reactive hot-melt adhesive composition that is moisture curable, the reactive hot-melt adhesive composition containing:
a urethane prepolymer having an isocyanate group;
a (meth)acrylic resin; and
a liquid polymer containing (meth)acryloyloxy groups and/or isocyanate groups.

By allowing the composition of the present technology to contain a liquid polymer having a (meth)acryloyloxy group and/or an isocyanate group as an adhesion promoter, the composition of the present technology exhibits even better adhesion than those of compositions containing a liquid polymer that does not contain any (meth)acryloyloxy group and/or isocyanate group.

Although the reason for this is not clear, it is conceived that, since the main chain portion of the liquid polymer has excellent affinity to a base material (especially, olefin) and since the (meth)acryloyloxy group and/or the isocyanate group is contained, high miscibility of the urethane prepolymer and/or the (meth)acrylic resin is achieved, thereby making it possible to exhibit excellent adhesion (especially, water resistant adhesion).

The urethane prepolymer will be described below. The urethane prepolymer contained in the composition of the present technology has an isocyanate group.

An example of a preferable aspect is one in which the urethane prepolymer is a urethane prepolymer having a plurality of isocyanate groups at molecular terminals in each molecule.

A conventionally known urethane prepolymer can be used as the urethane prepolymer. For example, a reaction product, obtained by reacting polyisocyanate with a compound having at least two active hydrogen-containing groups in each molecule (hereinafter, abbreviated as "active hydrogen compound") in a manner that the amount of the isocyanate group is in excess relative to the amount of the active hydrogen-containing groups, or the like can be used.

In the present technology, "active hydrogen-containing group" indicates "group containing an active hydrogen". Examples of the active hydrogen-containing group include a hydroxy group, an amino group, and an imino group.

Polyisocyanate

The polyisocyanate used during production of the urethane prepolymer is not particularly limited as long as the polyisocyanate has two or more isocyanate groups in each molecule.

Examples of the polyisocyanate include aromatic polyisocyanates, such as tolylene diisocyanate (TDI; e.g. 2,4-tolylene diisocyanate and 2,6-tolylene diisocyanate), diphenylmethane diisocyanate (MDI; e.g. 4,4'-diphenylmethane diisocyanate and 2,4'-diphenylmethane diisocyanate), 1,4-phenylene diisocyanate, polymethylene polyphenylene polyisocyanate, xylylene diisocyanate (XDI), tetramethylxylylene diisocyanate (TMXDI), tolidine diisocyanate (TODI), 1,5-naphthalene diisocyanate (NDI), and triphenylmethane triisocyanate; aliphatic and/or alicyclic polyisocyanates, such as hexamethylene diisocyanate (HDI), trimethylhexamethylene diisocyanate (TMHDI), lysine diisocyanate, and norbornane diisocyanate (NBDI), transcyclohexane-1,4-diisocyanate, isophorone diisocyanate (IPDI), bis(isocyanate methyl)cyclohexane ($H_6$XDI), and dicyclohexylmethane diisocyanate ($H_{12}$MDI); carbodiimide-modified polyisocyanates thereof; isocyanurate-modified polyisocyanates thereof; and allophanate-modified products thereof.

The polyisocyanate is preferably an aromatic polyisocyanate and more preferably an MDI from the perspective of excellent curability.

A single polyisocyanate can be used or a combination of two or more polyisocyanates can be used.

Active Hydrogen Compound

The compound having two or more active hydrogen-containing groups in each molecule (active hydrogen compound) that is used during production of the urethane prepolymer is not particularly limited. Examples of the active hydrogen-containing group include a hydroxy group (OH group), an amino group, and an imino group.

Preferred examples of the active hydrogen compound include polyols having two or more hydroxy groups in each molecule, polyamine compounds having two or more amino groups and/or imino groups in each molecule, and the like. Among these, a polyol is preferable.

The active hydrogen compound may be used alone, or a combination of two or more types of the active hydrogen compounds may be used.

Examples of the polyol include polyether polyols; castor oil-based polyols; polyester polyols; polymer polyols having a carbon-carbon bond in a main chain skeleton, such as acrylic polyols, polybutadiene diols, and hydrogenated polybutadiene polyols; low-molecular-weight polyhydric alcohols; and mixed polyols of these. Among these, preferred examples thereof include polyether polyols and castor oil-based polyols.

The polyether polyol is not particularly limited as long as the polyether polyol is a compound having a polyether as a main chain and having two or more hydroxy groups. "Polyether" is a group having two or more ether bonds, and specific examples thereof include a group having a total of two or more of structural units: —$R^a$—O—$R^b$—. Note that, in the structural unit, $R^a$ and $R^b$ each independently represent a hydrocarbon group. The hydrocarbon group is not particularly limited. Examples thereof include a straight-chain alkylene group having from 1 to 10 carbons.

Examples of the polyether polyol include polyoxyalkylene polyols, such as polyoxyethylene diol (polyethylene glycol), polyoxypropylene diol (polypropylene glycol; PPG), polyoxypropylene triol, ethylene oxide/propylene oxide copolymers, polytetramethylene ether glycol (PTMEG), and polytetraethylene glycol; sorbitol-based polyols; and the like.

The castor oil-based polyol is not particularly limited.

The polyol is preferably a bifunctional polyol (compound having two hydroxy groups in each molecule) and/or a trifunctional polyol (compound having three hydroxy groups in each molecule).

The bifunctional polyol is preferably polyoxyalkylene diol and/or castor oil-based diol, and more preferably at least one type selected from the group consisting of polyoxypropylene diol, polyoxyethylene diol, and castor oil-based diol.

The weight average molecular weight of the bifunctional polyol is preferably 5,000 or less, and more preferably from 2,000 to 4,000.

In the present technology, the weight average molecular weight of polyol is a value obtained by GPC analysis (solvent: tetrahydrofuran (THF)) based on calibration with polystyrene.

The amount of the bifunctional polyol is preferably from 30 to 80 parts by mass per 100 parts by mass total of a polyol and polyisocyanate that are used in production of the urethane prepolymer and the (meth)acrylic resin.

As the bifunctional polyol, castor oil-based polyol (especially, castor oil-based diol) is preferably used from the perspective of even better adhesion to base materials (especially, olefin resins). The amount of the castor oil-based polyol is preferably from 5 to 30 mass % relative to the total amount of the polyol(s) used in production of the urethane prepolymer.

The trifunctional polyol is preferably polyoxyalkylene triol, and more preferably polyoxyethylene triol and polyoxypropylene triol.

The weight average molecular weight of the trifunctional polyol is preferably 3,000 or greater, and from the perspective of excellent viscosity, strength, and adhesion, more preferably from 5,000 to 10,000.

The amount of the trifunctional polyol is preferably from 5 to 50 mass %, and more preferably from 5 to 45 mass %, relative to the total amount of the polyol(s) used in production of the urethane prepolymer.

The method of producing the urethane prepolymer is not particularly limited. For example, the urethane prepolymer can be produced by using polyisocyanate in a manner that from 1.3 to 2.5 mol of isocyanate group is reacted per 1 mol of the active hydrogen-containing group (e.g. hydroxy group) contained in the active hydrogen compound, and mixing these to perform a reaction.

The urethane prepolymer may be used alone, or a combination of two or more types of the urethane prepolymers may be used.

A description of the (meth)acrylic resin is given below. The (meth)acrylic resin contained in the composition of the present technology is not particularly limited.

By allowing the composition of the present technology to contain the (meth)acrylic resin, high adhesion can be exhibited at an initial stage.

In the present technology, (meth)acryl means acryl or methacryl.

The (meth)acrylic resin is not particularly limited as long as the (meth)acrylic resin is a polymer formed by polymerizing ethylenically unsaturated bonds contained in ethylenically unsaturated bond-containing monomers at least containing (meth)acrylic monomers. Examples of the (meth)acrylic monomer include (meth)acrylate-based monomers, acidic functional group-containing (meth)acrylic monomers, tertiary amine-containing (meth)acrylic monomers, hydroxy group-containing (meth)acrylic monomers, and (meth)acrylamide-based monomers. The ethylenically unsaturated bond-containing monomer other than the (meth)acrylic monomers is not particularly limited. Examples thereof include styrene and the like. The (meth)acrylic resin may be a homopolymer or a copolymer.

The production of the (meth)acrylic resin is not particularly limited. Examples thereof include conventionally known production methods. The (meth)acrylic resin may be used alone, or a combination of two or more types of (meth)acrylic resins may be used.

The amount of the (meth)acrylic resin is preferably from 20 to 50 parts by mass per 100 parts by mass of the urethane prepolymer from the perspective of excellent initial strength.

The liquid polymer will be described below.

The liquid polymer contained in the composition of the present technology is a polymer that has a (meth)acryloyloxy group and/or an isocyanate group as a substituent and that is liquid at ambient temperature.

The liquid polymer contained in the composition of the present technology can function as an adhesion promoter.

The main chain of the liquid polymer is not particularly limited. Examples thereof include polyisoprene, polybutadiene, hydrogenated products thereof, and the like.

The liquid polymer preferably has from 1 to 10, and more preferably from 2 to 5, of the (meth)acryloyloxy groups and/or the isocyanate groups in each molecule.

The (meth)acryloyloxy group is $CH_2=CR-CO-O-$ (R is a hydrogen atom or a methyl group).

The (meth)acryloyloxy group or the isocyanate group may be bonded to the main chain directly or via a hydrocarbon group that may have a hetero atom, such as an oxygen atom, a nitrogen atom, or a sulfur atom.

The hydrocarbon group is not particularly limited. The number of carbons contained in the hydrocarbon group may be from 1 to 30. Examples of the hydrocarbon group include aliphatic hydrocarbon groups having from 1 to 30 carbons, cycloaliphatic hydrocarbon groups having from 3 to 30 carbons, aromatic hydrocarbon groups having from 6 to 30 carbons, and combinations thereof. The hydrocarbon group may be a straight-chain or branched hydrocarbon group, and may have an unsaturated bond.

Note that the hydrocarbon group are exemplified as being monovalent or di- or higher valent. The same applies to examples of various hydrocarbon groups described below.

Examples of the aliphatic hydrocarbon group include a methyl group, an ethyl group, a propyl group, a butyl group, a pentyl group, a hexyl group, an octyl group, a decyl group, and an eicosyl group.

Examples of the alicyclic hydrocarbon group include a cyclopentyl group and a cyclohexyl group.

Examples of the aromatic hydrocarbon group include a phenyl group, a naphthalene ring, and an anthracene ring.

When the hydrocarbon group has a hetero atom, for example, at least one of the carbon atoms in the hydrocarbon group having two or more carbons may be substituted by hetero atom(s) or functional group(s) having a hetero atom (e.g. functional group that is di- or higher valent), and/or at least one of the hydrogen atoms in the hydrocarbon group (in this case, the number of carbons is not limited) may be substituted by functional group(s) having a hetero atom (e.g. functional group that is monovalent).

Examples of the functional group include monovalent functional groups, such as a hydroxy group, an amino group, a mercapto group, an isocyanate group, and an alkoxysilyl group; and functional groups that are di- or higher valent, such as a carbonyl group, a urethane bond, a urea bond, an allophanate bond, and an ester bond.

When at least one of the carbon atoms in the hydrocarbon group is substituted by hetero atom(s), the hetero atom(s) can form an ether bond, secondary amine, tertiary amine, or sulfide bond.

The production of the liquid polymer is not particularly limited. For example, the liquid polymer can be produced by mixing a raw material liquid polymer having a hydroxy group with a compound having a polyisocyanate and/or an isocyanate group and a (meth)acryloyloxy group in an amount in which the index (molar ratio of NCO/OH) is from 0.8 to 1.2, and reacting these in the presence of a tin catalyst in a nitrogen atmosphere at 60 to 80° C.

The raw material liquid polymer having a hydroxyl group is a polymer that has a hydroxyl group (OH group) and that is liquid at ambient temperature. Examples of the main chain are the same as those for the liquid polymer contained in the composition of the present technology.

The weight average molecular weight of the liquid polymer is preferably from 5,000 to 50,000, and more preferably from 10,000 to 30,000, from the perspectives of even better water resistant adhesion, miscibility, and workability.

The weight average molecular weight of the liquid polymer is a value obtained by gel permeation chromatography (GPC) using tetrahydrofuran (THF) as a solvent, based on the calibration with polystyrene standard. The polyisocyanate used in production of the liquid polymer is not particularly limited as long as the polyisocyanate is a compound having two or more isocyanate groups in each molecule. Examples thereof are the same as those for the polyisocyanate that can be used in production of the urethane prepolymer. Specific examples thereof include aliphatic polyisocyanates. Among these, isophorone diisocyanate and hexamethylene diisocyanate are preferable.

Examples of the compound having an isocyanate group and a (meth)acryloyloxy group used in production of the liquid polymer include compounds having at least one isocyanate group and at least one (meth)acryloyloxy group in each molecule.

Examples thereof include compounds in which a hydrocarbon group having an isocyanate group is bonded to an ester bond contained in a (meth)acryloyloxy group.

The liquid polymer may be used alone, or a combination of two or more types of the liquid polymers may be used.

In the present technology, the amount of the liquid polymer is preferably from 1 to 5 parts by mass, and more preferably from 1.5 to 3.0 parts by mass, per 100 parts by mass total of the polyol and the polyisocyanate used in production of the urethane prepolymer and the (meth)acrylic resin from the perspectives of even better water resistant adhesion and excellent workability.

Note that the liquid polymer is a polymer except the urethane polymer having an isocyanate group described above.

The composition of the present technology may further contain a reaction catalyst from the perspectives of even better water resistant adhesion and excellent curability. The reaction catalyst is not particularly limited as long as the reaction catalyst promotes reaction of isocyanate groups. Examples thereof include dimorpholinodiethylether. The reaction catalyst is preferably a reaction catalyst having excellent thermal stability.

The amount of the reaction catalyst is not particularly limited. For example, the amount of the reaction catalyst may be the same as conventionally known amount.

The composition of the present technology may contain, as necessary, additives, such as liquid polymers other than the liquid polymer contained in the composition of the present technology, fillers (e.g. carbon black and calcium carbonate), plasticizers, anti-aging agents, antioxidants, pigments, thixotropic agents, ultraviolet absorbers, flame retardants, surfactants, dispersing agents, dehydrating agents, and antistatic agents, in a range that does not inhibit the object of the present technology. The amounts of the additives are not particularly limited. For example, the amounts of the additives may be the same as conventionally known amounts.

The method of producing the composition of the present technology is not particularly limited. For example, the composition of the present technology can be produced by agitating a polyol that is used in production of the urethane prepolymer and a (meth)acrylic resin at 120° C. under reduced pressure, dehydrating the mixture of the polyol and the (meth)acrylic resin, then adding polyisocyanate used in production of the urethane prepolymer to the mixture after dehydration in a condition at 120° C., allowing these to react to produce a mixture of the urethane prepolymer and the (meth)acrylic resin, adding and mixing a liquid polymer and a reaction catalyst and an additive, which may be added as necessary, to the mixture.

The composition of the present technology may be formed into a one-part composition or a two-part composition.

When the composition of the present technology is used in a two-part composition, the composition of the present technology can be used as the main agent (first liquid), and a set of the main agent and a curing agent (curing agent in a broad sense; second liquid) can be formed.

The curing agent in a broad sense (second liquid) is not particularly limited as long as the curing agent contains a curing agent (curing agent in a narrow sense) as a curing component, and as long as the curing agent in a narrow sense is a compound that can react with the urethane prepolymer. Examples thereof include conventionally known curing agents.

Examples of the base material to which the composition of the present technology can be applied include plastics, glass, rubbers, metals, and the like.

Examples of the plastic include olefin resins, such as polypropylene and polyethylene, polyester resins, such as polyethylene terephthalate (PET) and polybutylene terephthalate (PBT), polymethyl methacrylate resins (PMMA resins), polycarbonate resins, polystyrene resins, acrylonitrile-styrene copolymer resins, polyvinyl chloride resins, acetate resins, ABS resins, and hardly adhesive resins, such as polyamide resins.

The base material may have undergone a surface treatment. Examples of the surface treatment include flame treatment, corona treatment, and ITRO treatment. These treatments are not particularly limited. Examples thereof include conventionally known methods.

The composition of the present technology is a reactive hot-melt adhesive composition that is moisture curable, and the composition of the present technology can be applied to a base material by heating and melting the composition.

The temperature at which the composition of the present technology is heated is preferably from 110 to 130° C.

The application method to the base material is not particularly limited. Examples thereof include conventionally known methods.

The composition of the present technology is a reactive hot-melt adhesive composition that is moisture curable, and the composition of the present technology can be reacted and cured by moisture. For example, the composition of the present technology can be cured in the condition of 5 to 90° C. at a relative humidity of 5 to 95 (% RH).

As the use of the composition of the present technology, the composition can be used in fields where moisture-curable hot-melt adhesives have been conventionally used. Examples thereof include adhesives for exterior materials and interior materials for building materials, adhesives for interior materials and exterior materials for use in automobiles, and the like.

EXAMPLES

The present technology is described below in detail using examples. However, the present technology is not limited to these examples.

Production of Urethane Prepolymer

The components (except the polyisocyanate) shown in the row of the urethane prepolymer in Table 1 and the (meth)acrylic resin were charged in a reaction vessel in amounts (part by mass) shown in the same table, agitated at 120° C. under reduced pressure for 2 hours to dehydrate a mixture of the polyol and the (meth)acrylic resin. Thereafter, the polyisocyanate shown in the row of the urethane prepolymer in Table 1 was added in an amount (part by mass) shown in the same table to the mixture after dehydration in a condition at 120° C., reacted under ambient pressure for 1 hour, further agitated under reduced pressure for 1 hour to produce a mixture of the urethane prepolymer and the (meth)acrylic resin. Note that the urethane prepolymer has an isocyanate group at a terminal thereof.

Production of Composition

To the mixture of the urethane prepolymer produced as described above (the amount of the urethane prepolymer is the total amount of the components shown in the row of the urethane prepolymer in Table 1) and the (meth)acrylic resin, the liquid polymer and the reaction catalyst shown in Table 1 were added in amounts (part by mass) shown in the same table and mixed using an agitator to produce a composition.

Evaluation

The following evaluations were performed using the compositions produced as described above. The results are shown in Table 1.

Initial Viscosity

The melt viscosity of the composition was measured using a Brookfield Viscometer (DV2T viscometer, manufactured by Brookfield AMETEK; No. 27 rotor; rotational speed: 5.0 rpm) in a condition at 120° C. Specifically, the composition was heated in advance to 120° C., and 11 g of the composition was weighed in a cup of the viscometer. The cup was set in the viscometer and heated at 120° C. for 15 minutes, then a rotor was set, and further heating was performed for 15 minutes. Thereafter, the measurement was started, and the numerical value after 2 minutes was used as an initial viscosity.

Viscosity Increase Percentage after Aging

After the initial viscosity was measured, the composition was left in a condition at 120° C. for 90 minutes, and then viscosity measurement was started. The value after 2 minutes from the start was read and used as the melt viscosity after aging. The value was then substituted into the formula below to calculate the viscosity increase percentage after aging.

Viscosity increase percentage after aging (%)=[(melt viscosity after aging−initial viscosity)/initial viscosity]×100

Initial Shear Strength

The composition produced as described above was melted at 120° C. and applied on polypropylene (having undergone a plasma treatment) having a width of 2.5 cm and a length of 5 cm. The polypropylene was compression-bonded with polycarbonate having a width of 2.5 cm and a length of 5 cm to form a lapped surface (width: 2.5 cm, length: 1 cm; thickness of the composition at the lapped surface: 5 mm) to produce a test piece.

The test piece was cured for 1 hour in a condition at 20° C. and 50% RH, and used as an initial sample.

The shear strength of the initial sample (initial shear strength) was measured at a tensile test speed of 50 mm/min in a condition at 20° C.

Shear Strength after Normal State Test

The initial sample obtained as described above was cured in a condition at 20° C. and 65% RH for 7 days to obtain a sample for normal state test.

The shear strength was measured using the sample for normal state test at a tensile test speed of 50 mm/min in a condition at 20° C. or at 120° C.

Shear Strength after Heat Resistance Test

The heat resistance test was performed by leaving the sample for normal state test obtained as described above in a condition at 120° C. for 7 days. The sample obtained after the test was used as a sample for heat resistance evaluation.

The shear strength was measured using the sample for heat resistance evaluation at a tensile test speed of 50 mm/min in a condition at 20° C. The shear strength after the heat resistance test (measured in a condition at 20° C.) was evaluated as being "excellent" when the shear strength after the heat resistance test was 70% or higher of the shear strength at normal state (shear strength after the normal state test described above (measured in a condition at 20° C.)).

Shear Strength after Water Resistant Adhesion Test

The hot water resistance test was performed by immersing the sample for normal state test obtained as described above in hot water at 40° C. for 7 days. After 7 days, the sample was taken out from the hot water and used as a sample for water resistant adhesion evaluation.

The shear strength was measured using the sample for water resistant adhesion evaluation at a tensile test speed of 50 mm/min in a condition at 20° C.

The water resistant adhesion was evaluated as being "excellent" when the retention ratio ("shear strength retention ratio after water-resisting aging" in Table 1) of the shear strength after the hot water resistance test (measured in a condition at 20° C.) was 70% or higher of the shear strength at normal state (shear strength after the normal state test described above (measured in a condition at 20° C.)).

TABLE 1

| | | Working Examples | | | | | | | | |
|---|---|---|---|---|---|---|---|---|---|---|
| | | 1 | 2 | 3 | 4 | 5 | 6 | 7 | 10 | 11 |
| Urethane prepolymer | Polyoxypropylene diol (PLEMINOL 510, manufactured by Asahi Glass Co., Ltd.; Mw: 4,000) | 37 | 30 | 38 | 37 | 37 | 15 | 37 | 37 | 37 |
| | Polyoxyethylene diol (PEG#2000U, manufactured by NOF Corporation; Mw: 2,000) | 15 | 15 | 15 | 15 | 15 | 15 | 15 | 15 | 15 |
| | Castor oil polyol (bifunctional, URIC #2766, manufactured by Itoh Oil Chemicals Co., Ltd.; Mw: 2,000) | 7 | 7 | | 14 | 7 | 7 | 7 | 7 | 7 |
| | Polyoxypropylene triol 1 (PLEMINOL S3011, manufactured by Asahi Glass Co., Ltd.; Mw: 10,000) | 7 | 15 | 15 | | | 30 | 7 | 7 | 7 |
| | Polyoxypropylene triol 2 (EXCENOL 3030, manufactured by Asahi Glass Co., Ltd.; Mw: 3,000) | | | | | 7 | | | | |
| | Polyisocyanate (diphenylmethane diisocyanate) | 9 | 8 | 7 | 9 | 9 | 5 | 9 | 9 | 9 |
| | Total content of components above used in production of urethane prepolymer | 75 | 75 | 75 | 75 | 75 | 72 | 75 | 75 | 75 |
| (Meth)acrylic resin | Acrylic resin (Dianal BR 106, manufactured by Mitsubishi Rayon Co., Ltd.; Tg: 50° C.; Mw: 60,000) | 25 | 25 | 25 | 25 | 25 | 25 | 25 | 25 | 25 |
| Liquid polymer 1 (methacryloyloxy group-containing liquid polyisoprene) | | 3 | 3 | 3 | 3 | 3 | 3 | | 1.5 | 8 |
| Liquid polymer 2 (isocyanate group-containing polyolefin) | | | | | | | | 3 | | |
| Liquid polymer for comparison | | | | | | | | | | |
| Reaction catalyst | DMDEE (Mitsui Fine Chemicals, Inc.) | 0.1 | 0.1 | 0.1 | 0.1 | 0.1 | 0.1 | 0.1 | 0.1 | 0.1 |
| Initial viscosity [cps] | Initial, at 120° C. | 17200 | 20950 | 18100 | 16950 | 21600 | 33100 | 19500 | 15800 | 22000 |
| Viscosity increase percentage after aging (%) | Viscosity increase percentage after 90 min at 120° C. | 7.8% | 8.6% | 9.2% | 5.5% | 15.9% | 20.2% | 9.2% | 5.1% | 11.2% |
| Initial shear strength [MPa] | After 1 hour at 20° C. | 0.7 | 0.9 | 0.9 | 0.6 | 1.1 | 1.5 | 0.9 | 0.7 | 0.7 |
| Shear strength after normal state test [MPa] | Normal state test: 20° C. for 7 days (shear strength was measured in an environment at 20° C.) | 4.3 | 4.5 | 3.5 | 3.9 | 4.8 | 5.1 | 4.3 | 4.1 | 4.2 |
| | Normal state test: 20° C. for 7 days (shear strength was measured in an environment at 120° C.) | 1.1 | 1.7 | 0.8 | 1.0 | 1.9 | 2.6 | 1.2 | 1.1 | 1.0 |
| Shear strength after heat resistance test [MPa] | (Heat resistance) normal state test: 20° C. for 7 days → heat resistance test: 120° C. for 7 days (shear strength was measured in an environment at 20° C.) | 4.5 | 4.8 | 3.1 | 3.0 | 4.6 | 5.3 | 4 | 4.5 | 3.9 |

TABLE 1-continued

| | | | | | | | | | | |
|---|---|---|---|---|---|---|---|---|---|---|
| Shear strength after hot water resistance test [MPa] | (Hot water resistance) normal state test: 20° C. for 7 days → hot water resistance test: 40° C. hot water for 7 days (shear strength was measured in an environment at 20° C.) | 4.0 | 4.1 | 2.7 | 2.8 | 3.5 | 4.3 | 3.8 | 3.6 | 3.5 |
| Shear strength retention ratio after water-resisting aging (%) | | 93% | 91% | 77% | 72% | 73% | 84% | 88% | 88% | 83% |

| | | | Comparative Examples | | |
|---|---|---|---|---|---|
| | | | 1 | 2 | 3 |
| Urethane prepolymer | | Polyoxypropylene diol (PLEMINOL 510, manufactured by Asahi Glass Co., Ltd.; Mw: 4,000) | 37 | 50 | 37 |
| | | Polyoxyethylene diol (PEG#2000U, manufactured by NOF Corporation; Mw: 2,000) | 15 | 20 | 15 |
| | | Castor oil polyol (bifunctional, URIC #2766, manufactured by Itoh Oil Chemicals Co., Ltd.; Mw: 2,000) | 7 | 9 | 7 |
| | | Polyoxypropylene triol 1 (PLEMINOL S3011, manufactured by Asahi Glass Co., Ltd.; Mw: 10,000) | 7 | 9 | 7 |
| | | Polyoxypropylene triol 2 (EXCENOL 3030, manufactured by Asahi Glass Co., Ltd.; Mw: 3,000) | | | |
| | | Polyisocyanate (diphenylmethane diisocyanate) | 9 | 12 | 9 |
| | | Total content of components above used in production of urethane prepolymer | 75 | 100 | 75 |
| (Meth)acrylic resin | | Acrylic resin (Dianal BR 106, manufactured by Mitsubishi Rayon Co., Ltd.; Tg: 50° C.; Mw: 60,000) | 25 | | 25 |
| Liquid polymer 1 (methacryloyloxy group-containing liquid polyisoprene) | | | | 3 | |
| Liquid polymer 2 (isocyanate group-containing polyolefin) | | | | | |
| Liquid polymer for comparison | | | | | 3 |
| Reaction catalyst | | DMDEE (Mitsui Fine Chemicals, Inc.) | 0.1 | 0.1 | 0.1 |
| Initial viscosity [cps] | | Initial, at 120° C. | 16700 | 9800 | 15800 |
| Viscosity increase percentage after aging (%) | | Viscosity increase percentage after 90 min at 120° C. | 4.9% | 8.2% | 6.3% |
| Initial shear strength [MPa] | | After 1 hour at 20° C. | 1.2 | Uncured | 0.2 |
| Shear strength after normal state test [MPa] | | Normal state test: 20° C. for 7 days (shear strength was measured in an environment at 20° C.) | 4.1 | 2.6 | 1.2 |
| | | Normal state test: 20° C. for 7 days (shear strength was measured in an environment at 120° C.) | 1.1 | 0.4 | — |
| Shear strength after heat resistance test [MPa] | | (Heat resistance) normal state test: 20° C. for 7 days → heat resistance test: 120° C. for 7 days (shear strength was measured in an environment at 20° C.) | 3.5 | 1.9 | 0.8 |
| Shear strength after hot water resistance test [MPa] | | (Hot water resistance) normal state test: 20° C. for 7 days → hot water resistance test: 40° C. hot water for 7 days (shear strength was measured in an environment at 20° C.) | 1.9 | 1.6 | 0.7 |
| Shear strength retention ratio after water-resisting aging (%) | | | 46% | 62% | 58% |

Details of the components shown in Table 1, from the liquid polymer 1 to the reaction catalyst, are as follows.

Liquid polymer 1: methacryloyloxy group-containing liquid polyisoprene, trade name: UC-102, manufactured by Kuraray Co., Ltd.; two methacryloyloxy groups are contained in each molecule; weight average molecular weight: 19,000; liquid at ambient temperature Liquid polymer 2: 100 g of polyolefin having a hydroxy group at a terminal (trade name: EPOL, manufactured by Idemitsu Kosan Co., Ltd.; two hydroxy groups are contained in each molecule; weight average molecular weight: 2,000) was charged in a flask and dehydrated at 120° C. under reduced pressure for 2 hours. Thereafter, the polyolefin was cooled to 80° C., and 11 g of isophorone diisocyanate (manufactured by Evonik Degussa) and 0.01 g of octyltin dilaurate were added thereto and reacted in a nitrogen atmosphere for 6 hours to produce a liquid polymer having an isocyanate group at a terminal. The obtained liquid polymer was used as the liquid polymer 2. The liquid polymer 2 had two isocyanate groups in each molecule. The weight average molecular weight of the liquid polymer 2 was 30,000. The liquid polymer 2 was liquid at ambient temperature.

Liquid polymer for comparison: non-substituted liquid polyisoprene; trade name: LIR-30, manufactured by Kuraray Co., Ltd.; weight average molecular weight: 28,000; glass transition temperature: −63° C.

Reaction catalyst DMDEE: dimorpholinodiethylether, manufactured by Mitsui Fine Chemicals, Inc.

As is clear from the results shown in Table 1, Comparative Example 1 which contained no liquid polymer exhibited low water resistant adhesion. That is, the shear strength retention ratio after the water-resisting aging (shear strength after hot water resistance test/shear strength after normal state test (measured in a condition at 20° C.)) was low.

Comparative Example 2 which contained no (meth) acrylic resin was not cured at the initial stage and exhibited low adhesion after the normal state test and low water resistant adhesion.

In Comparative Example 3 which contained the non-substituted liquid polymer (liquid polymer for comparison), the non-substituted liquid polymer was separated in the composition and did not become homogeneous even when the composition was heated to 120° C. Because of this, Comparative Example 3 exhibited low adhesive strength.

In contrast, Working Examples 1 to 7 exhibited excellent water resistant adhesion. That is, the shear strength retention ratio after the water-resisting aging (shear strength after hot water resistance test/shear strength after normal state test (measured in a condition at 20° C.)) was high.

Furthermore, when Working Example 1 and Working Example 5 are compared regarding the weight average molecular weights of polyoxyalkylene triols used in production of the urethane prepolymers, Working Example 1, in which the weight average molecular weight of the polyoxyalkylene triol was greater, exhibited even better water resistant adhesion than that of Working Example 5.

When Working Examples 1, 2, and 6 are compared, superior water resistant adhesion was exhibited when the amount of the polyoxyalkylene triol was smaller.

When Working Example 1 and Working Example 7 are compared regarding the liquid polymer, Working Example 1, in which the substituent contained in the liquid polymer was a (meth)acryloyloxy group, exhibited even better water resistant adhesion than that of Working Example 7, in which the substituent was an isocyanate group.

The invention claimed is:

1. A reactive hot-melt adhesive composition that is moisture curable, the reactive hot-melt adhesive composition comprising:

a urethane prepolymer having an isocyanate group;

a (meth)acrylic resin; and a liquid polymer containing (meth)acryloyloxy groups.

2. The reactive hot-melt adhesive composition according to claim 1, wherein an amount of the liquid polymer is from 1 to 5 parts by mass per 100 parts by mass total of the (meth)acrylic resin and a polyol and a polyisocyanate that are used in production of the urethane prepolymer.

3. The reactive hot-melt adhesive composition according to claim 1, wherein the urethane prepolymer is a compound produced by reacting at least one selected from the group consisting of bifunctional polyols and trifunctional polyols with polyisocyanate; and the bifunctional polyol is at least one type selected from the group consisting of polyoxypropylene diols, polyoxyethylene diols, and castor oil-based polyols.

4. The reactive hot-melt adhesive composition according to claim 3, wherein a weight average molecular weight of the trifunctional polyol is 5,000 or greater.

5. The reactive hot-melt adhesive composition according to claim 4, wherein an amount of the trifunctional polyol is from 5 to 50 mass % relative to a total amount of polyol used in production of the urethane prepolymer.

6. The reactive hot-melt adhesive composition according to claim 3, wherein an amount of the trifunctional polyol is from 5 to 50 mass % relative to a total amount of polyol used in production of the urethane prepolymer.

7. The reactive hot-melt adhesive composition according to claim 2, wherein the urethane prepolymer is a compound produced by reacting at least one selected from the group consisting of bifunctional polyols and trifunctional polyols with polyisocyanate; and the bifunctional polyol is at least one type selected from the group consisting of polyoxypropylene diols, polyoxyethylene diols, and castor oil-based polyols.

8. The reactive hot-melt adhesive composition according to claim 7, wherein a weight average molecular weight of the trifunctional polyol is 5,000 or greater.

9. The reactive hot-melt adhesive composition according to claim 8, wherein an amount of the trifunctional polyol is from 5 to 50 mass % relative to a total amount of polyol used in production of the urethane prepolymer.

10. The reactive hot-melt adhesive composition according to claim 7, wherein an amount of the trifunctional polyol is from 5 to 50 mass % relative to a total amount of polyol used in production of the urethane prepolymer.

11. The reactive hot-melt adhesive composition according to claim 1, wherein the liquid polymer further contains isocyanate groups.

* * * * *